United States Patent Office 2,700,028
Patented Jan. 18, 1955

2,700,028

MODIFIED POLYVINYL ACETAL COMPOSITIONS

Charles H. Jarboe, Louisville, Ky., assignor to E. I. du Pont de Nemours and Company, Wilmington, Del., a corporation of Delaware No Drawing. Application May 14, 1953,
Serial No. 355,188

2 Claims. (Cl. 260—45.8)

This invention relates to new compositions of matter and more particularly to a new composition of matter comprising a polyvinyl acetal, e. g. polyvinyl butyral, and a modifier thereof.

In the manufacture of high quality safety glass interliner, and particularly safety glass interliners which meet the high standards which have been established in connection with the use of safety glass in aircraft, it is essential to impart a considerably higher degree of thermal stability to the interliner than is obtainable in unmodified polyvinyl butyral resins. Various attempts have been made in the past to provide a polyvinyl butyral which exhibits improved thermal stability, without discoloration or loss of other desirable physical properties, and various additives have been suggested which have had the effect of inhibiting to some extent the thermal degradation of polyvinyl butyral resins without discoloration.

An object of this invention is to provide an improved polyvinyl acetal composition having high thermal stability.

It has been discovered, in accordance with the present invention, that polyvinyl acetals, and particularly butyrals, which are stabilized with 2-imidazoline-2-thiol of the resonating structure

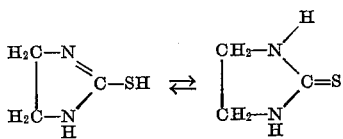

are outstandingly resistant to thermal degradation and discoloration.

The quantity of 2-imidazoline-2-thiol which is employed in the practice of this invention is generally within the range of about 0.05 to 5% of the weight of polyvinyl butyral, excellent results being obtained when the content of 2-imidazoline-2-thiol is in the range of about 0.1 to 1.0%. For economic reasons, it is generally better to employ the minimum effective quantity.

The following example shows the extraordinary effect of 2-imidazoline-2-thiol in preventing the breakdown of polyvinyl butyral at elevated temperatures. The viscosities given in the examples were measured at 25° C. The viscosity is that of a 5% solution of polyvinyl butyral in 2B ethanol (denatured alcohol in which there is 5% benzene).

EXAMPLE

A solution of 80 parts by weight of 2B alcohol and 5.8 parts of bis(beta-butoxyethyl)adipate plasticizer is (similar results being obtained also with dibutyl sebacate, triethylene glycol di-2-ethyl butyrate, and various other plasticizers) cooled to below −30° C. by means of a Dry Ice-methanol bath, and 14.2 parts of polyvinyl butyral flake is slowly mixed into the solution by means of an electric stirrer. When all of the flake is thoroughly mixed with the solution, the slurry is rapidly warmed to 36° C. The resulting dope is ready for use in about 4 hours. Alternatively, the same mixture can be made up without chilling the solvent and plasticizer but in this event the dope solution should be seasoned for about 72 hours prior to use. Into the dope solution is introduced 0.2 parts of 2-imidazoline-2-thiol per 100 parts of flake. The resulting solution containing the stabilizer is poured onto a clean dry sheet of glass and smoothed with a doctor blade to a thickness of 0.01 inch. Immediately after casting the sheet of glass is placed in a basin of cool distilled water and allowed to season until the alcohol solvent is removed from the film. The appearance of the plastic during this operation changes from water clear to a uniform opaque white. When completely seasoned, the film floats loose from the glass at the edges and is readily removed from the glass sheet. The film thus obtained is hung to drip free of excess water. During this stage of the process the film loses some of its internal moisture and the opacity is decreased somewhat. After this initial drying at room temperature, the film is dried for one hour in a circulating air oven at 80° C. A specimen of the film is then heated for an additional hour at 125° C. after which the viscosity is measured. A sample of the film which had not been heated at 125° C. was similarly tested using the same concentration of solution (the weight of film used in each case being the weight after drying one hour at 80° C.). It was determined that there was no decrease in viscosity as a result of additional heating for one hour at 25° C. and the resulting product was clear, colorless, and free of odor. In another test, polyvinyl butyral flake containing 0.2% of 2-imidazoline-2-thiol stabilizer was heated in an aluminum boat for exactly 20 minutes in a circulating air oven set for 150°±1° C. After removal from the oven and cooling to room temperature, a solution of 5% of polymer in 2B ethanol was made up and the viscosity was measured at 25°±1° C. Again the viscosity was compared with the correspondingly determined viscosity of unstabilized polyvinyl butyral flake which had not been subjected to the heating. It was further found that there was no decrease in viscosity and no evidence of any gelation of the polymer as a result of the heating. For comparison a large number of candidate stabilizers were evaluated by means of the latter test with the following results.

TABLE I

Table of candidate stabilizers evaluated

PHENOLS

| Name | Percent Viscosity Retained | Remarks |
|---|---|---|
| "Tenox"-butylated hydroxyanisole. | 100 | Colors film very pink. |
| nor-dihydroguaiuretic acid | 100 | Yellows film. |
| p-ethoxyphenol | 90 | No discoloration, no fusion. |
| p-benzyloxyphenol | 90 | Do. |
| m-aminophenol | 83 | Spotty discoloration, some fusion. |
| p-aminophenol | 79 | Do. |
| di-tertiaryarylbutyl-p-cresol | 65 | Some fusion. |
| di-nonylphenol | 64 | Do. |
| nonylphenol | 54 | Do. |
| octylphenol | 53 | Do. |
| 2,5-di-tertiarybutylhydroquinone. | 42 | Do. |
| dibenzylether of hydroquinone | None (gel) | Compound is insoluble in the dope. |
| diethyl ether of hydroquinone | None (gel) | Compound is soluble—discoloration and fusion on heating. |

AMINES

| Name | Percent Viscosity Retained | Remarks |
|---|---|---|
| thiodiphenylamine | 100 | Red solution—Green film. |
| o-mercaptoaniline | 75 | Some fusion, no discoloration. |
| 2-nitro diphenylamine | 61 | No fusion, little discoloration. |
| N-phenyl-B-naphthalyamine | 39 | Colors film red—purple. |
| diphenylamine [1] | 33 | Some fusion, red discoloration. |
| N-ethyl ethanolamine caproate | 32 | Some discoloration and fusion. |
| Alkamine JM-R (18 C atom RNH₂). | 27 | Some fusion. |
| Alkamine JM-T (18 C atom RNH₂). | 25 | Do. |
| 2-ethylhexylamine | 25 | Do. |

See footnotes at end of table.

TABLE I—Continued

UREA DERIVATIVES

| Name | Percent Viscosity Retained | Remarks |
|---|---|---|
| Phenylthiourea | 62 | No discoloration, some fusion. |
| diphenylguanidine | 48 | Some fusion, no discoloration. |
| di-o-tolylguanidine | 44 | Do. |
| Phenylurea | 25 | No discoloration, some fusion. |

MERCAPTANS

| Name | Percent Viscosity Retained | Remarks |
|---|---|---|
| "Lorol" mercaptan | None (gel) | Much discoloration and fusion. |

SULFIDES

| Name | Percent Viscosity Retained | Remarks |
|---|---|---|
| di 2-mercaptoethylsulfide | 39 | Some fusion. |
| 2-mercaptobenzothiazyldisulfide | 25 | Some fusion and discoloration. |
| tetramethyl thiuram monosulfide | 24 | Do. |

AZOLINE COMPOUNDS

| Name | Percent Viscosity Retained | Remarks |
|---|---|---|
| 2-imidazoline-2-thiol | 100 | No fusion or discoloration. |
| 5,5' dimethyl-2-mercaptooxazoline [2] (air seasoned) | 100 | Do. |

AZOLE COMPOUNDS

| Name | Percent Viscosity Retained | Remarks |
|---|---|---|
| 2 mercaptobenzothiazole | 100 | No fusion, film yellowed. |
| 2 mercaptoimidazole | 100 | No fusion, film brownish. |
| 2 mercaptobenzoxazole | 100 | Do. |
| 4,5-dimethyl-2-mercaptothiazole, 4-ethyl-2-mercaptothizole mixed and recrystallized [3] | none | Some fusion, much yellowing. |

MISCELLANEOUS

| Name | Percent Viscosity Retained | Remarks |
|---|---|---|
| IPD 694 [4] | 90 | No fusion, no discoloration. |
| Victor No. 21 (Organic Phosphate) | 30 | Some fusion, no discoloration. |

[1] Evaluation of a film which was air seasoned showed a viscosity retention of 55%.
[2] The synthesis of this compound showed it to be quite water soluble, hence the air seasoning. A water seasoned film showed no retention of viscosity.
[3] 85% 4,5-dimethyl-2-mercaptothiazole, 15% 4-ethyl-2-mercaptothiazole.
[4] Condensation product of 2-tertiarybutyl-4-methylphenol, p-cresol and n-butyraldehyde.

The results of the foregoing table show an outstanding and, indeed, unique combination of advantages which result from the use of 2-imidazoline-2-thiol, from the standpoint of retention of viscosity, retention of fusion temperature and resistance to discoloration upon heating. The only other stabilizer found which approached 2-imidazoline-2-thiol in all of these advantages was 2-thiazoline-2-thiol which is disclosed in copending application of the present applicant, S. N. 349,547, filed April 17, 1953, and issued June 8, 1954, as U. S. Patent 2,680,727. However, 2-imidazoline-2-thiol has an advantage over 2-thiazoline-2-thiol in that the latter compound imparts a slight odor which in particular circumstances is somewhat undesirable.

In view of the foregoing, it is apparent that 2-imidazoline-2-thiol is highly effective as a modifier for polyvinyl butyral safety glass interlayers and that it is effective when employed even in very small quantities. Its use thus constitutes a significant improvement in polyvinyl butyral sheeting for aircraft applications at a virtually negligible cost.

The invention is limited only as set forth in the following claims.

I claim:

1. A composition of matter comprising polyvinyl butyral and from 0.05 to 5% of 2-imidazoline-2-thiol based on the weight of the polyvinyl butyral.

2. A composition of matter comprising polyvinyl butyral and from 0.1 to 1.0% of 2-imidazoline-2-thiol based on the weight of the polyvinyl butyral.

No references cited.